(12) United States Patent
Hong

(10) Patent No.: US 7,263,538 B2
(45) Date of Patent: Aug. 28, 2007

(54) CURVE TRACING SYSTEM

(75) Inventor: Yan Hong, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 468 days.

(21) Appl. No.: 10/126,000

(22) Filed: Apr. 19, 2002

(65) Prior Publication Data

US 2003/0200236 A1  Oct. 23, 2003

(51) Int. Cl.
*G06F 15/00* (2006.01)
*G06K 9/30* (2006.01)

(52) U.S. Cl. ...................... 708/200; 382/316

(58) Field of Classification Search ........ 708/200–203, 708/446; 382/316
See application file for complete search history.

(56) References Cited

U.S. PATENT DOCUMENTS

| | | | | |
|---|---|---|---|---|
| 5,510,838 | A * | 4/1996 | Yomdin et al. | 348/390.1 |
| 5,579,444 | A * | 11/1996 | Dalziel et al. | 700/259 |
| 6,463,176 | B1 * | 10/2002 | Matsugu et al. | 382/195 |
| 6,621,941 | B1 * | 9/2003 | Syeda-Mahmood et al. | 382/306 |
| 2003/0095710 | A1 * | 5/2003 | Tessadro | 382/199 |
| 2003/0144585 | A1 * | 7/2003 | Kaufman et al. | 600/407 |
| 2004/0013305 | A1 * | 1/2004 | Brandt et al. | 382/224 |

OTHER PUBLICATIONS

Akash et al., Fusion of Rough set theoretic approximations and FCM for color image segmentation, 2000, IEEE, pp. 1529-1534.*
Yangkang et al., Automatic extraction of eye and mouth fields from monochrome face image using fuzzy technique, 1995, IEEE, pp. 778-782.*
David et al., Computing exact aspect graphs of curved objects: solids of revolution, 1989, IEEE, pp. 116-122.*
Alison et al., On computing aspect graphs of smooth shapes from volumetric data, 1996, IEEE, pp. 299-308.*
Arnaldo et al., A Class of Constrained Clustering Algorithms for Object Boundary Extraction, IEEE Transactions on Image Processing, vol. 5, No. 11, Nov. 1996, pp. 1507-1521.*

* cited by examiner

*Primary Examiner*—Chat C. Do
(74) *Attorney, Agent, or Firm*—Jackson Wlaker, LLP

(57) ABSTRACT

A curve tracing system and method of extracting a smooth curve from a plurality of image data points includes the steps of: partitioning the data points into a plurality of groups each defined by a center point, manipulating the center points into a sequential order, and re-partitioning the data points into a plurality of groups each defined by a center point with the condition that a curve passing through the center points must be smooth.

20 Claims, 14 Drawing Sheets

| | \multicolumn{15}{c|}{Cluster (j)} |
| | 1 | 2 | 3 | 4 | 5 | 6 | 7 | 8 | 9 | a (10) | b (11) | c (12) | d (13) | e (14) | f (15) |
|---|---|---|---|---|---|---|---|---|---|---|---|---|---|---|---|
| $k_1$ | 5 | 5 | 6 | a | 1 | 7 | 8 | 7 | b | 4 | e | a | f | b | d |
| $k_2$ | 2 | 4 | 5 | 2 | 2 | 3 | 6 | 9 | 8 | c | 9 | 4 | e | f | e |
| $f_{jk_1}$ | 11 | 9 | 9 | 10 | 12 | 9 | 12 | 11 | 10 | 11 | 17 | 9 | 13 | 13 | 15 |
| $f_{jk_2}$ | 7 | 7 | 7 | 6 | 12 | 8 | 10 | 11 | 7 | 7 | 9 | 2 | 3 | 8 | 9 |

FIGURE 3

CURVE TRACING SYSTEM

BACKGROUND TO THE INVENTION

1. Field of the Invention

The invention relates to curve tracing systems, and in particular to methods of extracting a smooth curve from noisy curve data.

2. Background Information

Noisy curves can be visually well defined but mathematically difficult to describe. Take FIG. 1 for example, the average person would not have any problem perceiving that it shows a curve that contains a peak and a valley. If a person were to trace the curve using a pen, they might typically use the following steps:

1. decide the general shape of the curve,
2. focus on a region and put the pen at the center of the region, and
3. move the pen smoothly to the center of the next region, and so forth until the curve was traced.

This task cannot be easily automated, on a computer for example, because machines cannot "see" like a human, whose perception involves integration of local and global features. For computer vision, this is currently an unsolved problem.

The, so called, fuzzy c-means (FCM) algorithm and several fuzzy c-shells clustering algorithms have been used successfully to extract circular, elliptical and rectangular curves or lines in noisy data using a computer. These techniques are well known, and work well where the curve or line is represented by a small number of parameters, for example a circle can be uniquely described by its center and radius. In the clustering algorithm, the center of the circle corresponds to the center of a cluster and the radius to the average distance between the data samples and the center.

However, known clustering algorithms are only effective in dealing with a small number of curve shapes. In the real world, most curves cannot be described accurately by a mathematical formula or by a reasonably small number of parameters. Therefore, the clustering methods cannot be used to extract many real world curves. Also, the known techniques are not very effective when used on unordered and noisy curve data.

SUMMARY OF THE INVENTION

It is an object of the present invention to provide a method for extracting a smooth curve from curve data that cannot easily be represented by a mathematical formula or small number of curve parameters.

It is a further object of the present invention to provide a method for extracting a smooth curve from unordered noisy data.

It is a yet further object of the present invention to provide a curve tracing system which at least ameliorates disadvantages with known curve tracing methods, or at least which provides the public with a useful alternative.

According to a first aspect of the invention there is provided a method of extracting a smooth curve from a plurality of image data points including the steps of:

(1) partitioning the data points into a plurality of groups each defined by a center point,
(2) manipulating the center points into a sequential order, and
(3) re-partitioning the data points into a plurality of groups each defined by a center point with the condition that a curve passing through the center points must be smooth.

The input data may be partitioned in into different groups using a c-means or c-shells clustering algorithm. The averages of the class membership values determines the closeness of one group to its neighboring groups. A group center is linked to the center of its two closest to obtain an initial representation of the curve, solving the vision problem described above. The data is partitioned again with the condition that the curve be smooth.

Preferably, the second step of manipulating the center points into a sequential order includes removing any looping paths.

Preferably, the second step of manipulating the center points into a sequential order includes determining if the smooth curve will be an open or a closed curve.

Preferably, the third step of partitioning the data points into a plurality of groups each defined by a center point with the condition that a curve passing through the center points must be smooth includes combining a criterion function from a c-means algorithm or c-shells clustering algorithm and a constraining term.

Preferably, each data member is associated with a group membership value continuous between 0 and 1.

Preferably, the data is pre-processed to reduce noise. Preferably, the image data is separated at corner points and or intersections to reveal subsets of data representing only smooth curves.

According to a second aspect of the invention there is provided a method of extracting a smooth curve from a plurality of image data points including the steps of:

(1) partitioning the data points into groups each defined by a center point,
(2) determining a spatial distance between a group and its neighbouring groups and arranging the group centers in terms of the spatial distance, and
(3) re-partitioning the data points into groups each defined by a center point with the condition that a curve passing through the center points must be smooth, including combining a criterion function from a c-means algorithm or c-shells clustering algorithm and a constraining term.

According to a third aspect of the invention there is provided a computer readable medium including instructions to a computer to perform the steps of:

(1) partitioning a plurality of image data points into a plurality of groups each defined by a center point,
(2) manipulating the center points into a sequential order, and
(3) re-partitioning the data points into a plurality of groups each defined by a center point with the condition that a curve passing through the center points must be smooth.

Preferably, the a c-means algorithm or c-shells clustering algorithm is used for the first step of partitioning the data points into a plurality of groups each defined by a center point.

Preferably, the second step of manipulating the center points into a sequential order includes determining a spatial distance between each group of data points and its neighbouring groups of data points, and ranking the groups in terms of the spatial distance.

Preferably, the third step of partitioning the data points into a plurality of groups each defined by a center point with the condition that a curve passing through the center points must be smooth includes combining a criterion function from a c-means algorithm or c-shells clustering algorithm and a constraining term.

According to a fourth aspect of the invention there is provided a method of extracting a smooth curve from a plurality of image data points of known shape including partitioning the data points into a plurality of groups each defined by a center point, with the conditions that a curve passing through the center points must be smooth and of a known shape.

Further aspects of the invention will become apparent from the following description, which is given by way of example only.

BRIEF DESCRIPTION OF THE DRAWINGS

Embodiments of the invention will now be describe with reference to the accompanying drawings in which:

FIG. 3 is a table containing information about the relationship between the clusters in FIG. 2, FIGS. 4, 5A and 5B illustrate the different relationships between the clusters in FIG. 2.

DESCRIPTION OF THE PREFERRED EMBODIMENTS

Figure 1:
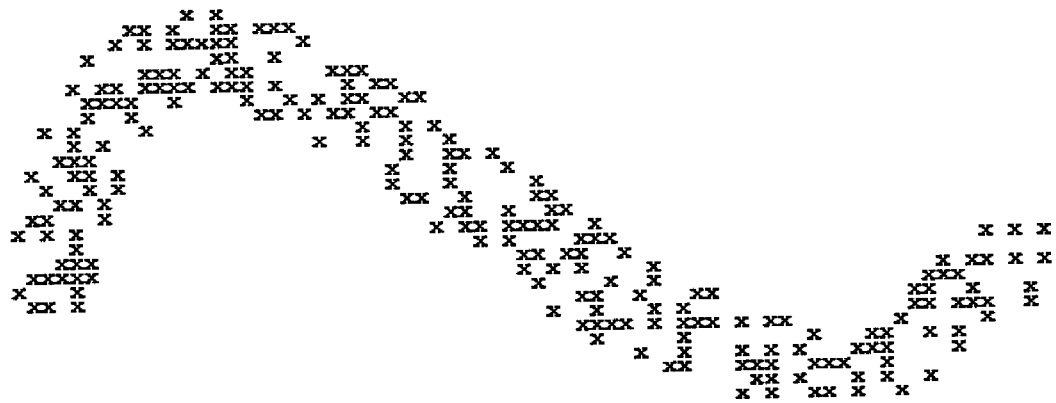
FIG. 1 is an example of unordered noisy curve data.

The preferred embodiment of the invention comprises a method of tracing a curve from a plurality of sampled data. The method includes the steps of:
1. Partition the input samples into separate regions using a cluster algorithm such as the Fuzzy C-Means (FCM) algorithm and represent each part using its cluster center.
2. Analyzing the relationship between the cluster centers to determine the closeness of one region to another. In the preferred embodiment this is achieved using a graph. Any loops in the graph are removed so that a line can be drawn through all cluster centers in a sequence to form the initial curve that is be used to represent the shape of the input samples.
3. Using the cluster centers obtained in Step 1 above, the data is re-clustered with the constraint that the curve passing through the cluster centers must be smooth.

The above three steps are designed to obtain similar results to those achieved by humans in perceiving curves and shapes. The computer is not effective in recognizing the overall shape represented by the input data. In the preferred embodiment of the invention this problem is ameliorated by reducing the data size and representing a region by its cluster center only. The general shape of the input data is determined according to the relationship of the cluster centers to give the general curve shape. The general curve shape is refined by adjusting local regions and requiring the curve to be smooth. The following description describes the steps in the process in more detail. For the purpose of the discussion the input data is defined as an series of data point $X=\{x_1, x_2, \ldots, x_n\}$. These data points are represented visually in FIG. 1.

The first step is to use the fuzzy c-means (FCM) method to separate (or cluster) the input data into regions or groups defined by a center point (or cluster center). The data is clustered into c classes represented by cluster centers that can be mathematically described as $V=\{v_1, v_2, \ldots, v_c\}$. Membership values can be defined as $U=\{\mu_{ik}, 0 \leq i \leq n, 0 \leq k \leq c\}$, where $\mu_{ik}$ is the membership value of $x_i$ belonging to class k and satisfies the following conditions $$0 < \mu_{ik} < 1 \ (\text{for } 0 \leq i \leq n, \ 0 \leq k \leq c) \quad (1)$$

$$\sum_{k=1}^{c} \mu_{ik} = 1 \ (\text{for } 0 \leq i \leq n) \quad (2)$$

In the FCM method, U and V are found by minimizing the following criterion function:

$$J_{FCM}(U, V; X) = \sum_{i=1}^{n} \sum_{k=1}^{c} \mu_{ik}^m |x_i - v_k|^2 \quad (3)$$

where m is the weighting exponent, which should be greater than 1. In the described embodiment m is set to 2.

The above optimization problem does not have a closed-form solution, but U and V can be found iteratively using the following two equations that constitute the FCM clustering procedure:

$$\mu_{ik} = \frac{|x_i - v_k|^{-2/(m-1)}}{\sum_{j=1}^{c} |x_i - v_j|^{-2/(m-1)}} \quad (4)$$

$$v_k = \frac{1}{\sum_{i=1}^{n} \mu_{ik}^m} \sum_{i=1}^{n} \mu_{ik}^m x_i \quad (5)$$

Figure 2:
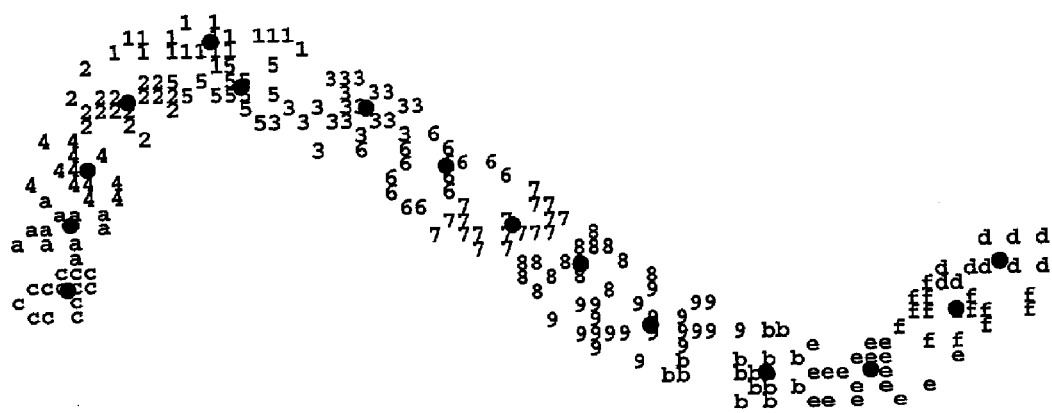
FIG. 2 shows the result of clustering the data in FIG. 1.

FIG. 2 shows the results of applying the above equations to the data series represented by FIG. 1. The data points in each region or cluster are represented by numerals 1 to 9 and characters a to f. The cluster centers are shown as bold dots near the center of each set of cluster data. In FIG. 2 each sample is classified into one of the c classes according to the following equation:

$$s_i = \arg\max_{k} \mu_{ik} \qquad (6)$$

That is, $x_i$ is assigned to the class for which the membership value is the maximum among all classes. The clustering procedure makes it possible to represent a large number of input samples using only a small number of cluster centers.

The FCM method reveals the positions of cluster centers and the class membership values of each data sample, but it does not provide any information about the spatial relations among the classes. The indices of cluster centers are generated in a random order and a line passing through the cluster centers in sequence $v_1, v_2, \ldots, v_c$ may not produce a meaningful curve. This is evident in the random order $(v_c, v_a, v_4, v_2, v_1, v_5, v_3, v_6, v_7, v_8, v_9, v_b, v_e, v_f, v_d)$ of the clusters in FIG. 2. The next step in the method is to reorder the cluster centers to reveal the general shape of the curve formed by the samples.

The first step in re-ordering the clusters is to determined the influence of one cluster on neighboring clusters. The influence factor of a cluster k on a neighboring cluster j can be defined mathematically as:

$$f_{jk} = \frac{100}{N_j} \sum_{i, s_i = j} \mu_{ik} \qquad (7)$$

where $N_j$ is the number of samples in class j. The influence factor $f_{jk}$ measures the average of class k membership values of class j samples. If clusters k and j are spatially close, then $f_{jk}$ is large, otherwise it is small.

Referring to the table in FIG. 3, for each cluster j the other clusters are ranked in descending order in terms of the values of $f_{jk}$ for all k ($k \neq j$). The first two clusters in the rank have indices $k_1$ and $k_2$, respectively, as shown in the second and third rows of the table. $k_1$ and $k_2$ represent two clusters closest to cluster j, one on each side along the curve. The line connecting the three adjacent clusters $k_1$, j and $k_2$ represents the segment of the curve passing through the three cluster regions.

In an alternative embodiment the influence factor is calculated using the geometric distance between the cluster centers instead of the membership values.

Figure 4:
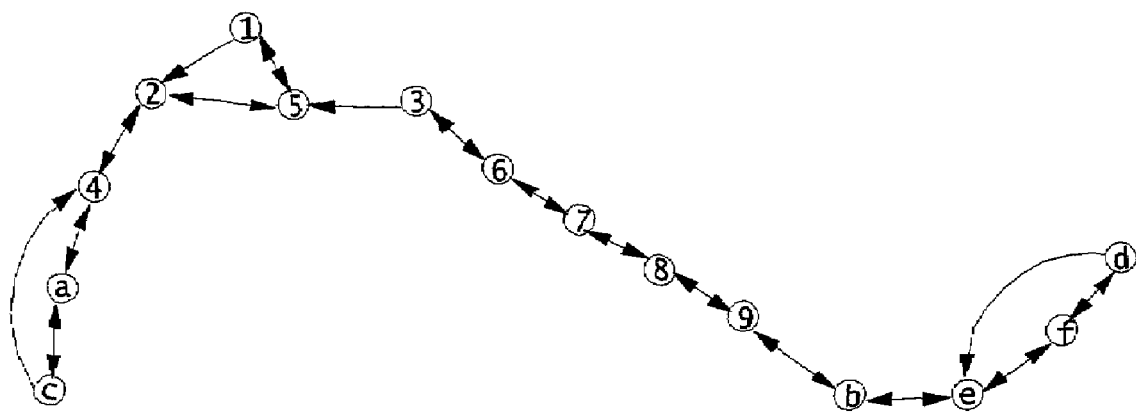

FIG. 4 shows a graphical (visual) representation on the cluster centers and the relationship (or influence) between a cluster j and its neighbors $k_1$ and $k_2$. Each vertex (node) corresponds to a cluster center (each j value) and from each vertex there is an edge (link) pointing to the neighboring clusters $k_1$ and $k_2$ respectively. In the relational graph, most links are bi-directional. For example, the link between nodes 7 and 8 is bi-directional. This means that clusters 7 and 8 are each their own closest clusters. This is confirmed from the table in FIG. 3. In this case, the curve segment passing through nodes 7 and 8 can be traced uniquely. That is, a line is drawn from node 8 to node 7 if the trace direction is from left to right; or node 7 to node 8 if the trace direction is from right to left. A simple rule is used to determine the direction of the trace. Consider drawing from node 6 to node 7. Node 7 is linked to nodes 6 and 8. Since node 6 was the previous point passed through the next node must be 8. The start point is chosen as a terminal node, described later, from which the trace can only move one way.

However, some nodes are their neighbours form loops that have to be resolved before the trace can be drawn. These loop involve uni-directional links. For example, there is a link pointing from node d to node e but not from node e to node d. In this case, the trace is not uniquely defined because there can be a loop "d-e-f-d-e-b . . . " or a curve "d-f-e-b-9 . . . ", depending on the direction of drawing the trace. All loops in the graph must be removed in order to obtain a unique curve.

Figure 5A:
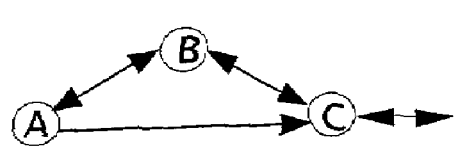
Figure 5B:
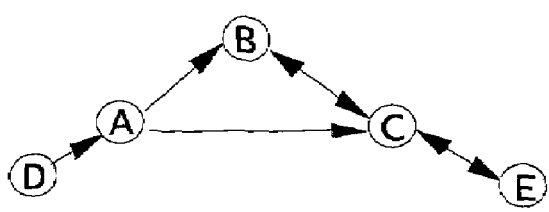

FIGS. 5A and 5B illustrate two types of loops respectively. FIG. 5A shows an end loop, where node A is a terminal node that must have just one closest neighbor. FIG. 5B shows a middle loop, where edge A-C is a short cut between node A and Node C that skips node B. A middle loop can be found at a turning point of a curve, especially when the original curve is thick.

The two types of loops are detected in a relational graph using the influence factor and an angle measurement. If $\theta_{XY}$ is the angle between the horizontal plane and the edge connecting two nodes X and Y the following rules can be used to break the loops in FIGS. 5A and 5B.

Rule 1: For three given nodes A, B and C that form a loop in a relational graph of cluster centers, if $$|\theta_{AB} - \theta_{AC}| < \theta_e \text{ and } t \, f_{AC} < f_{AB} \qquad (8)$$

where $\theta_e$ and t are threshold constants, then the loop is a terminal loop as shown in FIG. 5A, A is the terminal node and the edge from node A to node C (A-C) must be removed.

Rule 2: For three given nodes A, B and C that form a loop and two nodes D and E connected to the loop in a relational graph of cluster centers, if $$|\theta_{AB} - \theta_{AC}| < \theta_e \text{ and } t \, f_{AC} < \min\{f_{BA}, f_{AD}, f_{BC}, f_{CE}\} \qquad (9)$$

where $\theta_e$ and t are threshold constants and $\min\{f_{BA}, f_{AD}, f_{BC}, f_{CE}\}$ means the minimum of all four values, then the loop is a middle loop as shown in FIG. 5B and the edge from node A to node C (A-C) must be removed.

Rules 1 and 2 are used to remove end and middle loops respectively to define the curve uniquely. In Rule 1, edge A-C is determined to be a false link when the curve passes through A, B and C is smooth. The first inequality in rule 1 Equation (8) requires that an open curve does not have a sharp turn at two ends. For example, nodes A, B and C form a straight line if the difference between the two angles corresponding to A-B and A-C respectively $|\theta_{AB} - \theta_{AC}| = 0$. When the curvature at B increases, the difference $|\theta_{AB} - \theta_{AC}|$ also increases. According to the first inequality, A-B-C as part of a smooth curve when the difference between two angles is less than a threshold. The second inequality requires B be closer to C than A so that A is the unique terminal node.

Rule 2 has the same requirement for the difference between two angles, but it also requires that A and C each have another neighbor, that A be closer to B and D than C and that C be closer to B and E than A. When these conditions are satisfied, a middle loop is removed.

Note that we can use Rule 1 to remove an end loop (FIG. 5A) and Rule 2 to remove a middle loop (FIG. 5B). However, if either node D or E does not exist then A or C has no other connection and it should also be a terminal node.

In the two rules 1 and 2 the choices of the two thresholds $\theta_e$ and t is data dependent. For curves with large curvatures, the rules may not work if the threshold $\theta_e$ is too large and t is too small. To determine the correct values a first calculation is made with a small $\theta_e$ value and a large t value to impose the most restrictive conditions. If all loops are not removed after applying the two rules, $\theta_e$ is increased and t decreased and the two rules applied again. The procedure is repeated until all loops are removed gradually. In the described embodiment the values of $\theta_e=25°$ and t=3 are used and give satisfactory results with the curve shown in FIGS. 5A and 5B. However, as will be shown later this is not critical to the invention as any mistakes made in the graph analysis step may be corrected with the smoothness constraint applied in the second clustering procedure.

Figure 6:
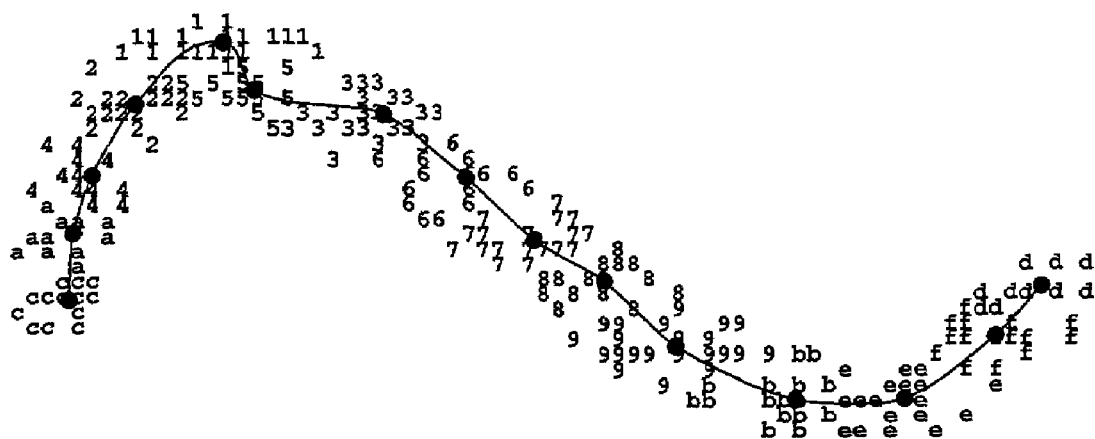
FIG. 6 shows the general shape of the curve obtained by analyzing the relationship between the clusters.

Applying the above rules to the graph in FIG. 4 removes edges c-4, 2-5 and d-e. Edges 1-2 and 3-5 are reformulated to be bi-directional once link 2-5 is removed. The resultant curve is shown in FIG. 6. The curve can be generated by spline or interpolation methods, for example cubic B-spline interpolation of the cluster centers.

In an alternative embodiment a procedure similar to the known traveling salesman's problem is used to resolve any loops in the cluster centers. The object of this type of method is to visit each cluster center without looping and to keep the total traveling distance minimal. Other methods will be apparent to the skilled addressee.

The curve in FIG. 6 is not as smooth as the shape of the original input data because there is no constraint on the spatial distribution of the cluster centers generated by the FCM algorithm. The next step in the method is to correct this by clustering the data again with the constraint that the curve passing through the cluster centers must be smooth.

In order to keep the notation simple in the following description the cluster centers are considered as re-ordered and re-indexed from 1 to f along the curve. That is: $v_1$, $v_2$, $v_3$, $v_4$, $v_5$, $v_6$, $v_7$, $v_8$, $v_9$, $v_{10}$, $v_{11}$, $v_{12}$, $v_{13}$, $v_{14}$, $v_{15}$ instead of $v_{12}$, $v_{10}$, $v_4$, $v_2$, $v_1$, $v_5$, $v_3$, $v_6$, $v_7$, $v_8$, $v_9$, $v_{11}$, $v_{14}$, $v_{15}$, $v_{13}$ to represent all cluster centers from left to right along the curve in FIG. 6.

The smoothness of a curve represented by z=f(t) can be measured by its curvature $$K(t) = \frac{\left|\frac{d^2z}{dt^2}\right|}{\left[1+\left(\frac{dz}{dt}\right)^2\right]^{3/2}}$$

A smooth curve should have small K(t) values. To make the formulation tractable only the numerator and the second order derivative are considered. To smooth the curve represented by the discrete vector sequence $v_1, v_2, v_3, \ldots, v_c$, the second order difference $v_{k+1}-2v_k+v_{k-1}$ is reduced for every $v_k$. The criterion function in Equation (3) and the squared term of the second order difference $|v_{k+1}-2v_k+v_{k-1}|^2$ are then minimized at the same time to make the curve smooth. Two types of curve are possible, open curves, as shown in FIG. 6, and closed curves, such as circles.

For an open curve, the two terms are combined as follows:

$$J_{FCT}(U, V; X) = \sum_{i=1}^{n} \sum_{k=1}^{c} \mu_{ik}^m |x_i - v_k|^2 + \alpha \sum_{k=2}^{c-1} |v_{k+1} - 2v_k + v_{k-1}|^2 \tag{10}$$

where the first term on the right is the cost function in the original FCM algorithm, the second term is the smoothness constraint and $\alpha$ is weighting coefficient. The summation in the second term on the right goes from k=2 to k=c−1 since the second order difference does not exist for an open curve at either the first point $v_1$ or the last point $v_c$.

Setting $\partial J_{FCT}(U, V; X)/\partial v_k=0$, we have $$\alpha(v_{k+2} - 2v_{k+1} + v_k) + \sum_{i=1}^{n} \mu_{ik}^m(v_k - x_i) = 0 \qquad \text{(for } k = 1\text{)}$$

$$-2\alpha(v_{k+1} - 2v_k + v_{k-1}) + \alpha(v_{k+2} - 2v_{k+1} + v_k) + \sum_{i=1}^{n} \mu_{ik}^m(v_k - x_i) = 0 \qquad \text{(for } k = 2\text{)}$$

$$\alpha(v_k - 2v_{k-1} + v_{k-2}) - 2\alpha(v_{k+1} - 2v_k + v_{k-1}) +$$
$$\alpha(v_{k+2} - 2v_{k+1} + v_k) + \sum_{i=1}^{n} \mu_{ik}^m(v_k - x_i) = 0 \qquad \text{(for } 3 \le k \le c - 2\text{)}$$

$$\alpha(v_k - 2v_{k-1} + v_{k-2}) - 2\alpha(v_{k+1} - 2v_k + v_{k-1}) + \sum_{i=1}^{n} \mu_{ik}^m(v_k - x_i) = 0 \qquad \text{(for } k = c - 1\text{)}$$

$$\alpha(v_k - 2v_{k-1} + v_{k-2}) + \sum_{i=1}^{n} \mu_{ik}^m(v_k - x_i) = 0 \qquad \text{(for } k = c\text{)}$$

From these equations, we can find $$v_k = \frac{\alpha(2v_{k+1} - v_{k+2}) + \sum_{i=1}^{n} \mu_{ik}^m x_i}{\alpha + \sum_{i=1}^{n} \mu_{ik}^m} \quad (\text{for } k = 1) \tag{11}$$

$$v_k = \frac{\alpha(2v_{k-1} + 4v_{k+1} - v_{k+2}) + \sum_{i=1}^{n} \mu_{ik}^m x_i}{5\alpha + \sum_{i=1}^{n} \mu_{ik}^m} \quad (\text{for } k = 2) \tag{12}$$

$$v_k = \frac{\alpha(-v_{k-2} + 4v_{k-1} + 4v_{k+1} - v_{k+2}) + \sum_{i=1}^{n} \mu_{ik}^m x_i}{6\alpha + \sum_{i=1}^{n} \mu_{ik}^m} \quad (\text{for } 3 \leq k \leq c - 2) \tag{13}$$

$$v_k = \frac{\alpha(-v_{k-2} + 4v_{k-1} + 2v_{k+1}) + \sum_{i=1}^{n} \mu_{ik}^m x_i}{5\alpha + \sum_{i=1}^{n} \mu_{ik}^m} \quad (\text{for } k = c - 1) \text{ and} \tag{14}$$

$$v_k = \frac{\alpha(-v_{k-2} + 2v_{k-1}) + \sum_{i=1}^{n} \mu_{ik}^m x_i}{\alpha + \sum_{i=1}^{n} \mu_{ik}^m} \quad (\text{for } k = c) \tag{15}$$

When $\alpha = 0$, $J_{FCT}(U, V; X) = J_{FCM}(U, V; X)$ and Equations (12) to (15) will be the same as Equation (5). Since $\partial J_{FCT}(U, V; X)/\partial \mu_{ik} = \partial J_{FCM}(U, V; X)/\partial \mu_{ik}$, Equation (4) can be used to update $\mu_{ik}$.

Figure 7:
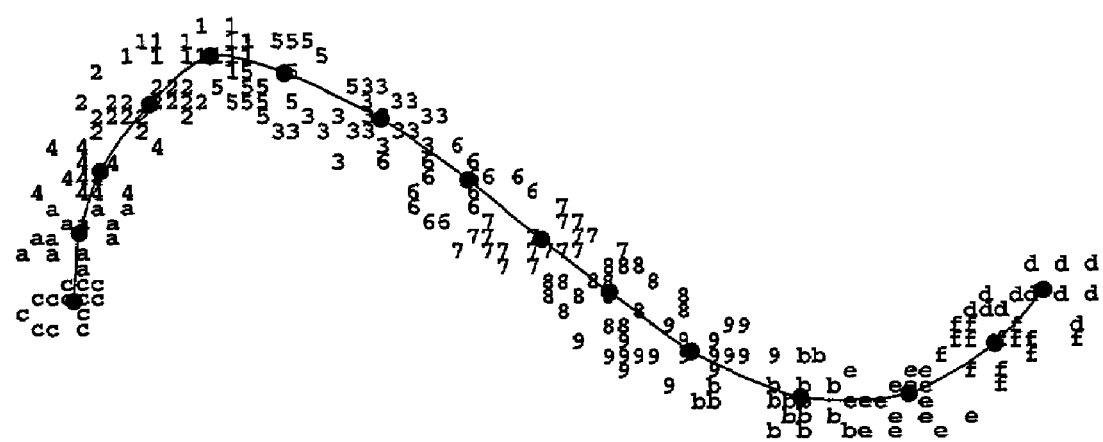
FIG. 7 illustrates the final result obtained using a curve tracing method according to the invention.

Applying the above procedure to the curve in FIG. 6 the result shown in FIG. 7 is achieved. The curve of FIG. 7 much smoother and is in accordance with human perception. A major change in the second clustering process is that cluster center of region "5" moved up to smooth the curve. There are also small changes to other clusters.

While it is possible to use the hard c-means, or another clustering method, in the first clustering process (first step), a fuzzy formulation is important in the second clustering process (third step). In the hard c means clustering method the membership value is either 0 or 1. This means that some clusters may become empty and the corresponding cluster centers will be undefined. If a cluster center is missing the cluster center sequence must be reordered and the second order difference recalculated as the smoothness constraint. This may change the neighborhood relations between the clusters with the result that the curve will not be well defined. This can also cause the iterative process to diverge. In the fuzzy clustering method, each input sample is associated with a cluster center with a membership value in the continuous range of 0 to 1, thus none of the clusters will become empty in fuzzy clustering unless a very simple and degenerated data set is used.

Figure 8:
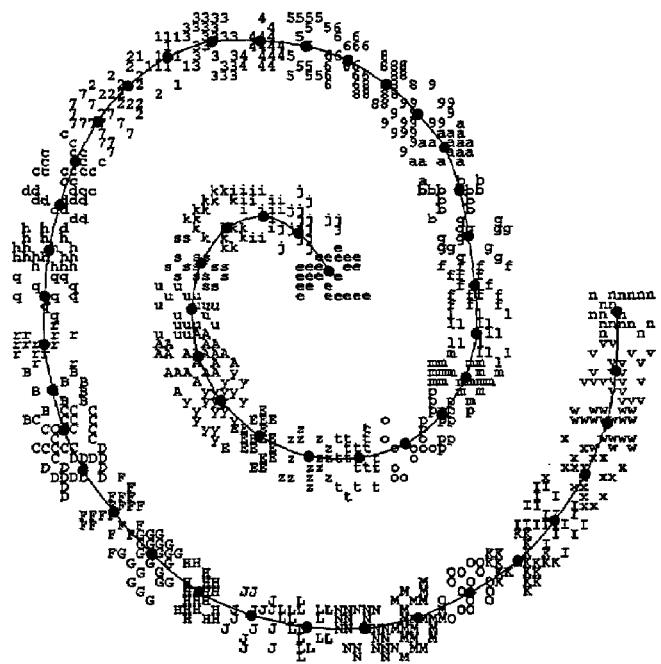
FIGS. 8 to 13 illustrate the results of applying using the curve tracing method to various forms of curve data.

Referring to Equation (10) above, the parameter a determines the contribution of the smoothness term in the criterion function. If $\alpha$ is small, the first term in the equation, which measures the compactness of the clusters, is dominant, so the final curve will not be very smooth. In the extreme case in which $\alpha = 0$, the procedure will be degenerated to the original FCM clustering process. On the other hand, if $\alpha$ is large, the smoothness term is dominant. In the extreme case the second term is so dominant that the iterative process will produce a trivial and non-useful solution with all $v_k$'S equal to the same arbitrary value. Thus, there is an upper limit to the value of $\alpha$, beyond which the results are not useful. This limit depends on the input data as well as the value of c, the number of clusters used, and can be found by experimentation. FIG. 8 shows the resultant curve using c=50 and $\alpha = 2$. When $\alpha$ is increased to 2.5 with the data in FIG. 8 the result is non-useful. If c is increased to 55 then useful results are not obtained when $\alpha$ is 2.

Except in its effect on $\alpha$, the method is relatively insensitive to the choice of c (the number of clusters for the FCM algorithms). The choice of c is based on the average number of samples in each cluster, which is set to 10 to 25. For the image shown in FIG. 8 useful results are obtained for the following additional combinations: c=40, $\alpha$=2; c=50, $\alpha$=2; c=45, $\alpha$=2; c=55, $\alpha$=1.9.

Equation (10) above is applicable to open curves. For closed curves Equation (10) becomes equation (16) below.

$$J_{FCT}(U, V; X) = \sum_{i=1}^{n} \sum_{k=1}^{c} \mu_{ik}^m |x_i - v_k|^2 + \alpha \sum_{k=1}^{c} |v_{MOD(k+1,c)} - 2v_k + v_{MOD(k-1,c)}|^2 \tag{16}$$

where the function MOD is defined by $$MOD(j,c) = \begin{cases} j+c & \text{if } j \le 0 \\ j & \text{if } 1 \le j \le c \\ j-c & \text{if } j > c \end{cases}$$

The equation for updating $\mu_{ik}$ is unchanged, but the equation for updating $v_k$ becomes $$v_k = \frac{\alpha[-v_{MOD(k-2,c)} + 4v_{MOD(k-1,c)} + 4v_{MOD(k+1,c)} - v_{MOD(k+2,c)}] + \sum_{i=1}^{n} \mu_{ik}^m x_i}{6\alpha + \sum_{i=1}^{n} \mu_{ik}^m} \quad \text{for } 1 \le k \le c \quad (17)$$

Figure 9:
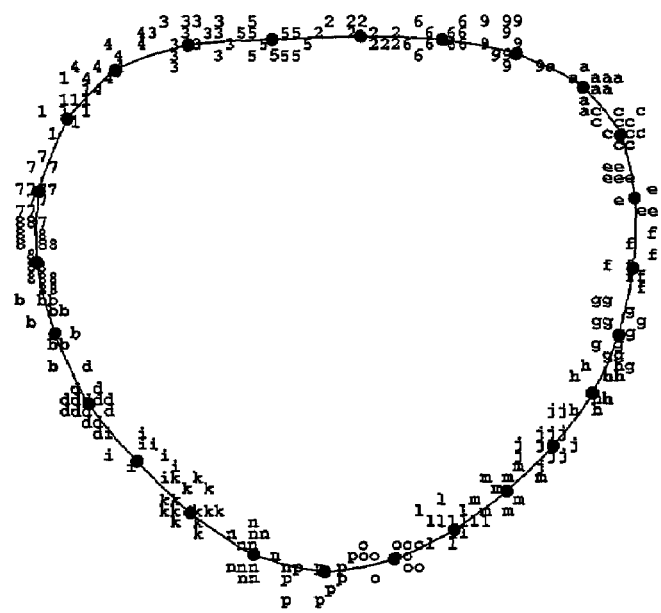

Referring to FIG. 9, in real world applications a determination must be made as to whether a curve is open or closed before the equation, (10) or (16) can be chosen. This can be achieved in the graph analysis (step 2) above. The curve must be a closed one if no terminal nodes are found.

The following examples illustrate the advantages of the invention.

Figure 10A:
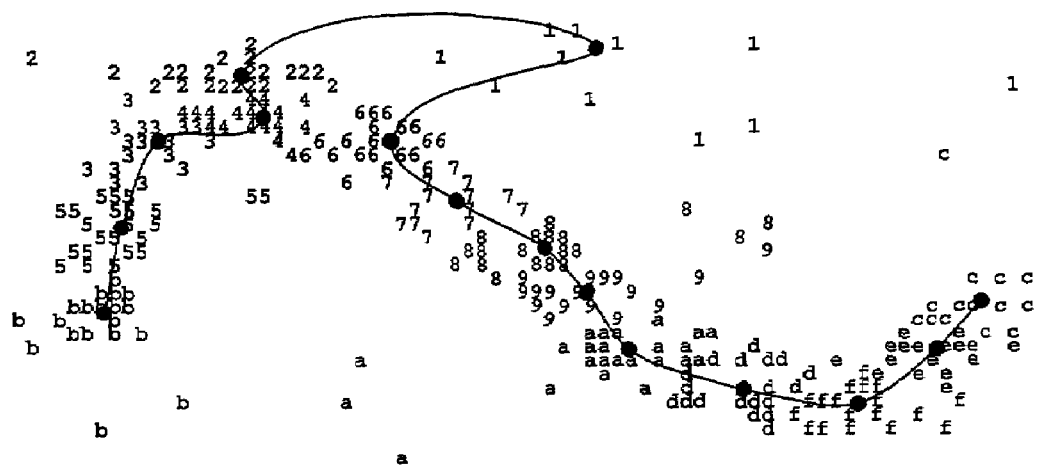
Figure 10B:
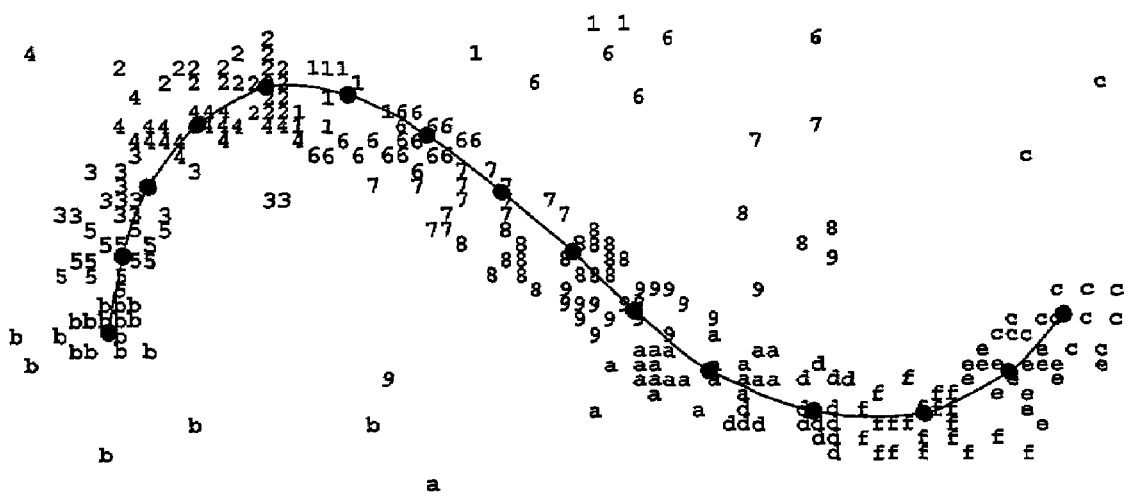

FIGS. 10A and 10B show an example of a traced curve, according to the invention, from noisy data. The input image was obtained by flipping 2% of the pixels randomly from black to white or vice versa in the image of FIG. 1. The FCM algorithm is sensitive to noise and outliers in the data, but the method of the invention is relative immune to noise. The initial curve, in FIG. 10A, is formed from the first two steps of the invention, and is heavily distorted, but gives the general shape. The final curve has almost the same quality as the curve obtained from the noise free image. The constraint term in the third step reduces the influence of the noisy samples.

Although the method is relatively insensitive to noise because of the smoothness constraint, it can still produce an unreliable result due to mistakes if a closed curve is incorrectly determined as an open one or vice versa. This might occur if the initial data is too noisy. It is therefore important to reduce the effect of noise when the initial curve is formed. This can be achieved by preprocessing the data in a known manner.

Figure 11:
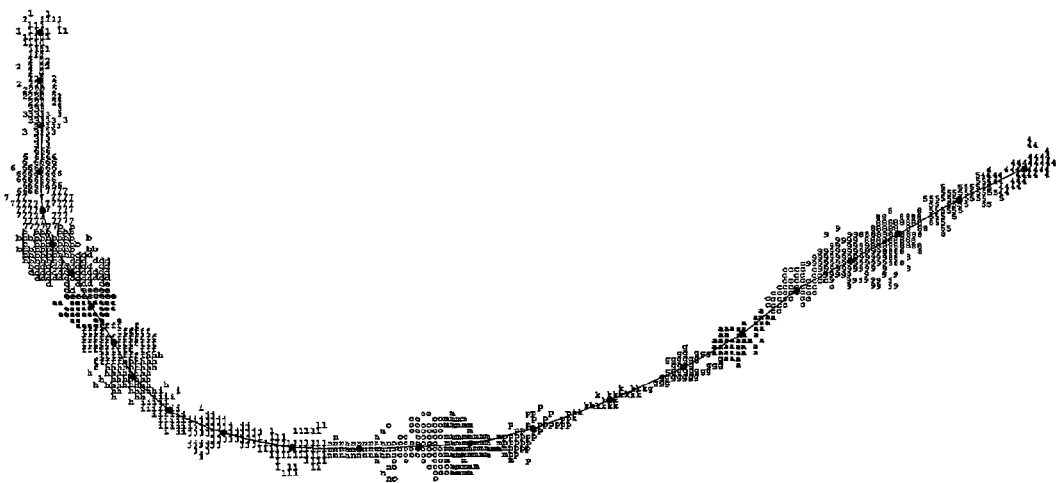

The curve data dealt with above comprises curves that have more or less the same width. FIG. 11 illustrates the result of tracing a curve from curve data with an uneven thickness. The result is not effected by the unevenness.

Figure 12:
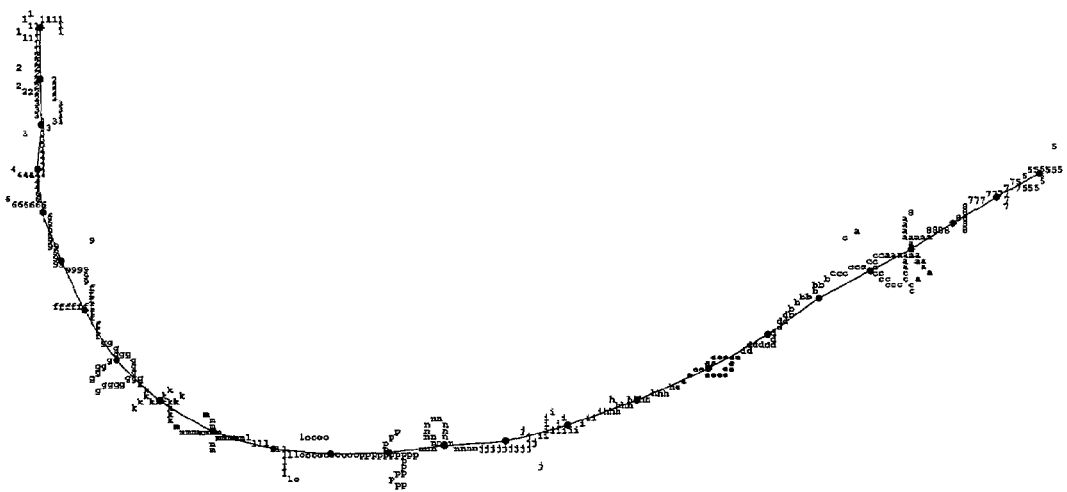

FIG. 12 shows the result of applying the method to data from a curve with uneven width and irregular short line segments scattered around the curve. FIG. 12 also shows that the method improves the results with curve data that has been subjected to image thinning and skeletonization algorithms. Most image thinning methods gradually remove redundant pixels that do not affect the skeleton connectivity. Because the skeleton connectivity must be preserved, and the procedure usually makes the decision to remove a pixel based on local image information, the thinning result usually contains many holes and spurious short lines. These undesirable characteristics are present in the curve data of FIG. 12. The method according to the invention extracts the curve from curve data distorted by these holes and lines.

Figure 13:
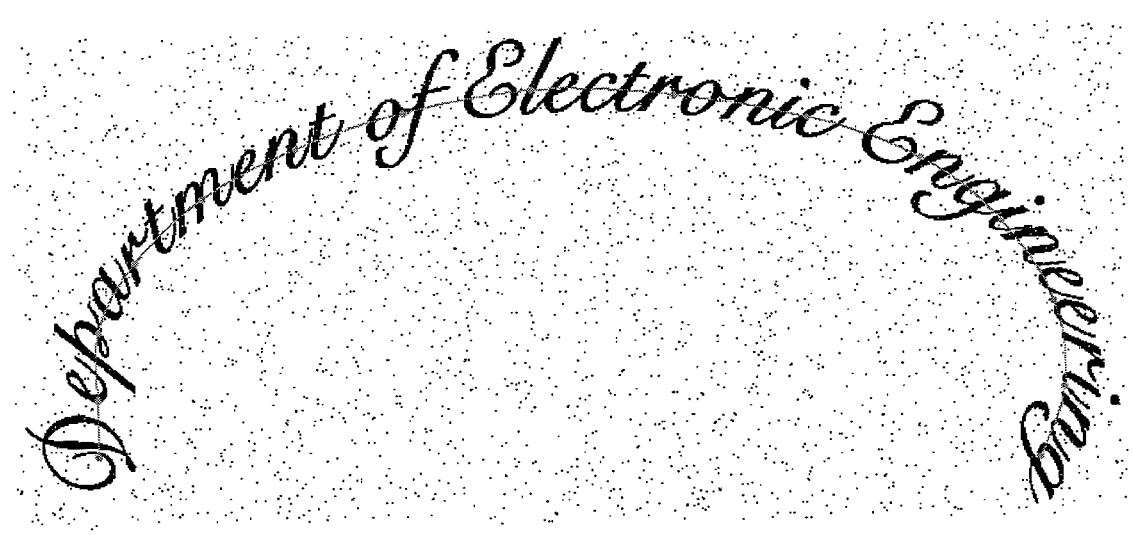
Figure 14A:
FIG. 14 illustrates and example of a multi-resolution clustering approach according to a second embodiment of the invention.
Figure 14B:
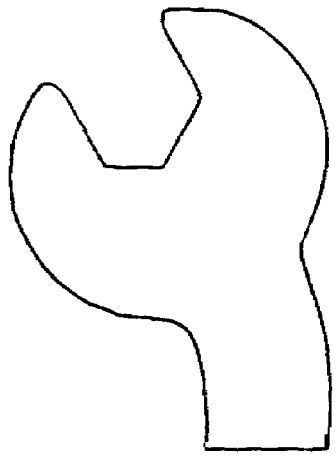
Figure 14C:
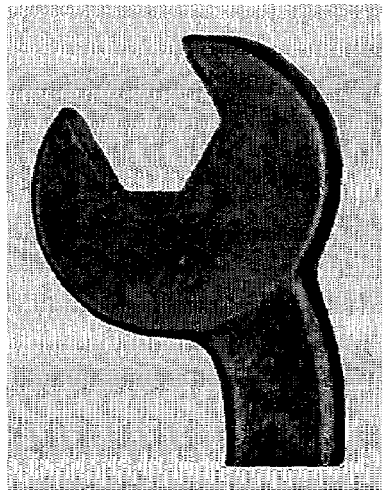
Figure 14D:
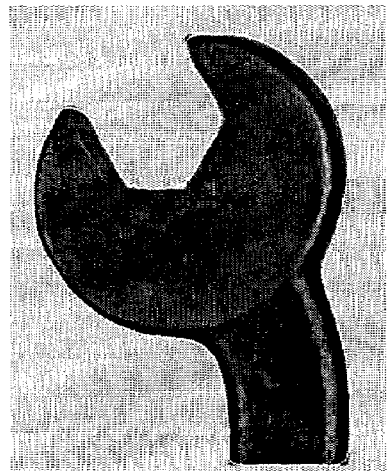
Figure 14E:
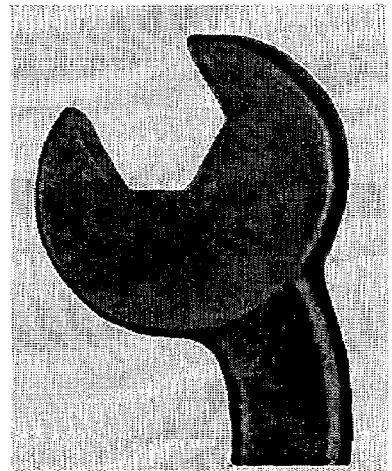

FIG. 13 shows the experimental result for a scanned image. The image in FIG. 13 was generated by scanning printed text at the resolution of 300 dpi. The text follows a curved path like many artistic and advertisement documents. The image was corrupted with noise by flipping 2% of pixels randomly from black to white or vice versa. It would be difficult to determine the text path using traditional document image processing methods based on analysis of locations of individual characters or text lines along horizontal or vertical directions because many of the characters are connected and the text goes in different directions in the image. The curved line passing through the text is generated by the method according to the invention. The method works well with the noisy text image.

The above examples illustrate use of the invention on two-dimensional (2D) curve data. The invention is equally applicable to higher dimensions. Mathematically, the method converts samples scattered in an m-dimensional (m-D) space, or a m-D binary function $f(x_1, x_2, \ldots, x_m)$, to m 1-D sequences $\{x_1(t), x_2(t), \ldots, x_m(t)\}$. That is, the dimensionality of the data is reduced and it is the order of the 1-D sequence that makes the curve tracing and the curve shape meaningful.

The above examples show results of the method with curves that are smooth from the beginning to the end and that do not intersect with another curve or itself. To use the method on curves with intersections or sharp corners the data is first segmented into several parts at corner points or intersections to reveal several sets of data representing only smooth curves. Each set of data is treated separately.

If the initial the curve data represents a known shape, such as a straight line or a circle, then an alternative embodiment of the invention is possible wherein the first two steps of the above method can be omitted. Consider n input samples $X=\{x_1, x_2, \ldots, x_n\}$ in a d-dimensional space $R_d$, which form a curve represented by an ordered sequence of c cluster centers $V=\{v_1, v_2, \ldots, v_c\}$. For boundary detection and skeleton extraction from two-dimensional (2D) images, each data sample and cluster center is a 2D vector, representing a point in the 2D space. A method of an alternative embodiment of the invention finds V (the cluster centers), given X, based on a clustering procedure with curve shape constraints imposed. The method is described in detail below.

Let $\{\mu_{ik}, 0 \le i \le n, 0 \le k \le c\}$, where $\mu_{ik}$ is the membership value of $x_i$ belonging to cluster class k and satisfying the following conditions:

$$0 \le \mu_{ik} < 1 \quad \text{(for } 0 \le i \le n, 0 \le k \le c\text{)} \quad (18)$$

$$\sum_{k=1}^{c} \mu_{ik} = 1 \text{ (for } 0 \leq i \leq n) \quad (19)$$

In order to find the cluster centers V that fit the data samples X optimally, the following energy function is minimized for a closed curve:

$$J_{FCT}(U, V; X) = \qquad (20)$$
$$\sum_{i=1}^{n}\sum_{k=1}^{c} \mu_{ik}^{m}|x_i - v_k|^2 + \sum_{k=1}^{c} \alpha_k|v_{k+1} - 2v_k + v_{k-1}|^2 + \sum_{k=1}^{c} \beta_k|v_{k+1} - v_k|^2$$

where $\alpha_k$ and $\beta_k$ are weighting coefficients and m is usually set to 2. The cluster index should be taken circularly for a closed curve, that is, k−j should be replaced with k−j+c if k−j<0, and k+j should be replaced with k+j−c if k+j>c, where j=1 or 2.

The following function is minimized for an open curve:

$$q_{1k} = \begin{cases} 0 & \text{for } k \leq 2 \\ 1 & \text{for } k \geq 3 \end{cases}, q_{2k} = \begin{cases} 0 & \text{for } k \leq 1 \\ 1 & \text{for } 2 \leq k \leq c-1, \\ 0 & \text{for } k = c \end{cases} q_{3k} = \begin{cases} 1 & \text{for } k \leq c-2 \\ 0 & \text{for } k \geq c-1 \end{cases} \quad (24)$$

$$q_{4k} = \begin{cases} 0 & \text{for } k = 1 \\ 1 & \text{for } k \geq 2 \end{cases}, q_{5k} = \begin{cases} 1 & \text{for } k \leq c-1 \\ 0 & \text{for } k = c \end{cases}$$

$$J_{FCT}(U, V; X) = \qquad (21)$$
$$\sum_{i=1}^{n}\sum_{k=1}^{c} \mu_{ik}^{m}|x_i - v_k|^2 + \sum_{k=2}^{c-1} \alpha_k|v_{k+1} - 2v_k + v_{k-1}|^2 + \sum_{k=1}^{c-1} \beta_k|v_{k+1} - v_k|^2$$

For an open curve, the cluster index should be strictly between 1 and c.

The first term in the right-hand side of Equations (20) and (21) is from the fuzzy c-means (FCM) algorithm, which measures a weighted distance of input samples to the cluster centers. The second term is the second order difference of the cluster center sequence, which imposes the curve smoothness condition. The third term is the first order difference of the cluster sequence, which requires the distance between cluster centers to be small. Equations (20) and (21) have two differences from our equation in (10) above. Firstly, there is another term, the third term. Secondly, there is a weighting coefficient for each second order difference before summation in the second term instead of a signal coefficient for the entire un-weighted summation, to make the formulation more general.

Similar to the FCM and original FCT algorithms, we can find $\mu_{ik}$ iteratively using the following equation:

$$\mu_{ik} = \frac{|x_i - v_k|^{-2/(m-1)}}{\sum_{j=1}^{c} |x_i - v_j|^{-2/(m-1)}} \quad (22)$$

This equation is applicable to both closed and open curves.

To find $v_k$, $\partial J_{FCT}(U, V; X)/\partial v_k = 0$, which yields for both Equations (20) and (21)

$$q_{1k}\alpha_{k-1}(v_k - 2v_{k-1} + v_{k-2}) - 2q_{2k}\alpha_k(v_{k+1} - 2v_k + v_{k-1}) + \quad (23)$$
$$q_{3k}\alpha_{k+1}(v_{k+2} - 2v_{k+1} + v_k) + q_{4k}\beta_{k-1}(v_k - v_{k-1}) +$$
$$q_{5k}\beta_k(v_k - v_{k+1}) + \sum_{i=1}^{n}\mu_{ik}^{m}(v_k - x_i) = 0$$

where for a closed curve $q_{jk}=1 (1>j\leq 5, 1\leq k\leq c)$, and for an open curve From Equation (23), we can find $v_k$ iteratively as follows $$v_k = \frac{\sum_{j=-2}^{j=2} w_{k+j}v_{k+j} + \sum_{i=1}^{n}\mu_{ik}^{m}x_i}{w_k + \sum_{i=1}^{n}\mu_{ik}^{m}} \quad (25)$$

where $$w_{k-2} = -q_{1k}\alpha_{k-1} \quad (26)$$

$$w_{k-1} = 2q_{1k}\alpha_{k-1} + 2q_{2k}\alpha_k + q_{4k}\beta_{k-1} \quad (27)$$

$$w_k = q_{1k}\alpha_{k-1} + 4q_{2k}\alpha_k + q_{3k}\alpha_{k+1} + q_{4k}\beta_{k-1} + q_{5k}\beta_k \quad (28)$$

$$w_{k+1} = 2q_{2k}\alpha_k + 2q_{3k}\alpha_{k+1} + q_{5k}\beta_k \quad (29)$$

$$w_{k+2} = -q_{3k}\alpha_{k+1} \quad (30)$$

Equations (22) and (25) constitute an iterative solution to the curve tracing problem. In the first embodiment, the cluster centers are found from the FCM algorithm and a re-ordering process based on the relational graph. In this alternative embodiment the initial curve is defined as a simple shape, such as a straight line or a circle. Once the cluster centers are found, one way to generate the curve is simply to connect $v_k$ to its two neighbors $v_{k-1}$ and $v_{k+1}$. This is a linear interpolation of the cluster center points. A smoother curve can be produced by interpolating cluster centers, for example, based on the third order B-splines.

Three parameters are important: convergence, accuracy and speed. If the parameters $\alpha_k$ and $\beta_k$ are chosen properly and a multi-resolution cluster approach is used the method can be facilitated to converge and be more accurate. Furthermore, computational speed is increased by down sampling the input data.

The following discussion is on the terms $\alpha_k$ and $\beta_k$ and their influence on the convergence.

Equation (23) can be rewritten as $$-w_{k-2}v_{k-2} - w_{k-1}v_{k-1} + w_k v_k - w_{k+1}v_{k+1} + w_{k+2}v_{k+2} = \sum_{i=1}^{n} \mu_{ik}^m x_i \quad (31)$$

where $w_{k-2}$ to $w_{k+2}$ are given in Equations (26) to (30). This is a set of linear equations in terms of $v_k$ if $\mu_{ik}$ is kept fixed. A simple way to analyze the convergence property is to view Equation (31) as the Gauss-Seidel iteration for solving the set of linear equations. A Gauss-Seidel algorithm is guaranteed to converge if the matrix representing the equations is diagonally dominant. This is a sufficient condition, not a necessary one. The iteration may or may not converge if the matrix is not diagonally dominant.

Equation (31) goes from k=1 to k=c and each $v_k$ is d-dimensional, that is, $$v_k = [v_{k1}\ v_{k2}\ \ldots\ v_{kd}]^T \quad (32)$$

Therefore, the corresponding matrix has the size of cd×cd and has the block diagonal form as follows:

$$A = \begin{bmatrix} A_1 & & & \\ & A_2 & & 0 \\ & & \ddots & \\ & 0 & & \ddots \\ & & & & A_d \end{bmatrix} \quad (33)$$

where $$A_1 = A_2 = \cdots = A_d = \begin{bmatrix} w_1+s_1 & -w_2 & -w_3 & 0 & \cdots & 0 & -w_{c-1} & -w_c \\ -w_1 & w_2+s_2 & -w_3 & -w_4 & 0 & \cdots & 0 & -w_c \\ & & \ddots & & & & & \\ & & & \ddots & & & & \\ -w_1 & -w_2 & 0 & \cdots & 0 & -w_{c-2} & -w_{c-1} & w_c+s_c \end{bmatrix} \quad (34)$$

and where $$s_k = \sum_{i=1}^{n} \mu_{ik}^m \quad (35)$$

is defined as the summed class membership (SCM) values of all input samples for cluster k. The relation between the SCM and the parameters $\alpha_k$ and $\beta_k$ plays a critical role for the algorithm to converge. For A to be diagonally dominant for a closed curve $$|w_k+s_k| > |w_{k-2}| + |w_{k-1}| + |w_{k+1}| + |w_{k+2}| \quad (36)$$

becomes $$\alpha_{k-1} + \alpha_{k+1} < \frac{1}{2}s_k \quad \text{(for } 1 \le k \le c\text{)} \quad (37)$$

For an open curve, the matrix A is diagonally dominant if $$\begin{cases} \alpha_2 < \frac{1}{2}s_1 \\ \alpha_3 < \frac{1}{2}s_2 \\ \alpha_{k-1} + \alpha_{k+1} < \frac{1}{2}s_k \quad \text{(for } 3 \le k \le c-2\text{)} \\ \alpha_{c-2} < \frac{1}{2}s_{c-1} \\ \alpha_{c-1} < \frac{1}{2}s_c \end{cases} \quad (38)$$

Equations (37) and (38) are the sufficient conditions for closed and open curves respectively for matrix A to be diagonally dominant. Under these conditions, the iteration would converge if Equation (25) were applied repetitively with $\mu_{ik}$ kept constant. In practice, Equations (22) and (25) are applied alternatively in the iterations, so the conditions in Equations (37) and (38) do not seem to be directly applicable.

The matrix A is also the Hessian (second order derivative) of JFCT(U, V; X) with respect to $v_k$. If A is diagonally dominant, all its eigenvalues are positive. The Hessian of JFCT(U, V; X) with respect to $\mu_{ik}$ can be easily shown to be a diagonal matrix and is positive definite. Although the joint Hessian matrix of JFCT(U, V; X) with respect to $\mu_{ik}$ and $v_k$ has non-zero diagonal elements and its eigenvalues cannot be easily determined. The FCT algorithm converges, at least along a subsequence, to a local optimal solution as long as Equation (36) is satisfied. Intuitively, the energy function in Equation (20) or (21) reduces in both Equation (22) and Equation (25), so the compound procedure makes the energy descent strictly.

If we set $\alpha_1=\alpha_2=\ldots=\alpha_c=\alpha$, $\beta_1=\beta_2=\ldots=\beta_c=\beta$, then Equations (37) and (38) become $$\alpha < \frac{1}{2} \min_k \sum_{i=1}^n \mu_{ik}^m = \frac{1}{2} \min_k s_k \qquad (39)$$

From above it can be concluded that the SCM $s_k$ is roughly inversely proportional to c, the number of clusters for a give set of n input samples. This suggests that the diagonal dominance condition can be satisfied more easily and hence the FCT algorithm can converge more easily if c is small. However, a small number of clusters may not fit the data well especially when the desired curve contains sharp corners. To achieve a high accuracy a multi-resolution clustering approach is used. After applying the FCT algorithm with a small c rough result of the curve are obtained which provide a better approximation than the initial curve. More points are then inserted in the rough curve, for example, by linear interpolation, and then the FCT algorithm applied again to achieve a better result.

The multi-resolution clustering approach described here should not be confused with commonly multi-resolution image processing methods. The former deals with different resolutions of the clusters, or different details of the curve, but it keeps the same resolution for the image in both steps, while the latter would process both the image and the curve in different resolutions.

An example of the multi-resolution clustering based approach is shown in FIG. 14. From the original tool image in FIG. 14(a), we detect and threshold the edge pixels first (FIG. 14(b)). At the low-resolution step 20 points were used distributed along fours sides of the gray square as initial cluster centers and then produced the final white curve shown in FIG. 14(a). The result obtained from the FCT algorithm in the low-resolution step does provide a reasonably good approximation of the object boundary, but it is not accurate enough especially around the corners simply because there are not enough points around the curve.

Nine points are inserted between each pair of neighboring points on the low-resolution curve to produce a high-resolution curve containing 200 points. The FCT algorithm is applied again to obtain the result shown in FIG. 14(c). The curve now fits the object boundary well. As a comparison, in FIG. 14(d) we show the curve-tracing result from a single resolution step where 70 points are used along the curve. Clearly the result from the multi-resolution approach is better.

As discussed above, a large n, the number of input sample, is needed for high stability of the algorithm, but the iterations have a complexity proportional to n. In some images there may be more than enough image pixels for determining the curve. In these cases, the number of input samples can be reduced by down sampling if the stability of the algorithm is not a problem. For example, only two points are needed to define a straight line in a noise free image. However, more samples may be needed to detect a noisy line, but many pixels along the line can still be redundant.

Figure 15A:
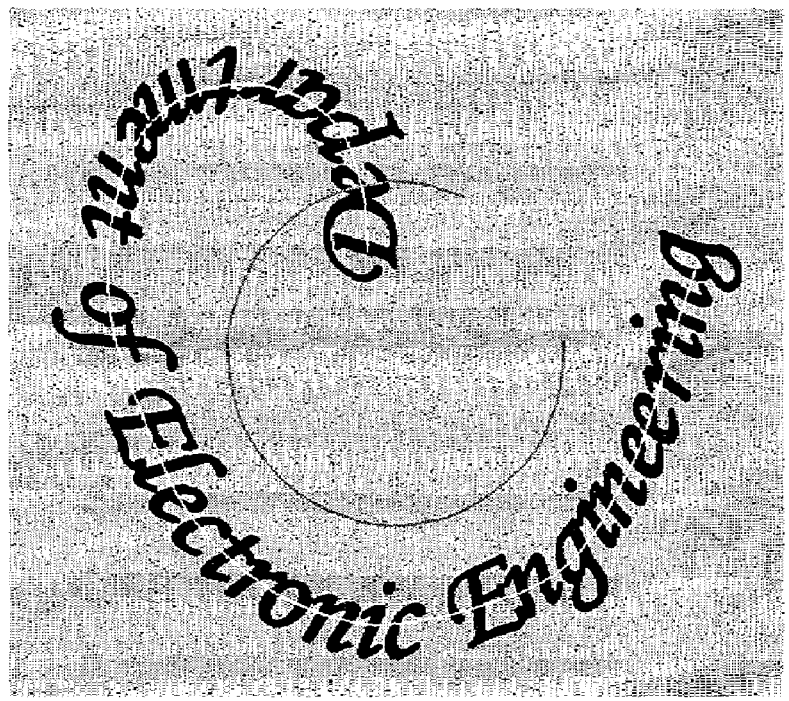
FIG. 15 illustrates and example of down sampling of foreground pixels according to a second embodiment of the invention.
Figure 15B:
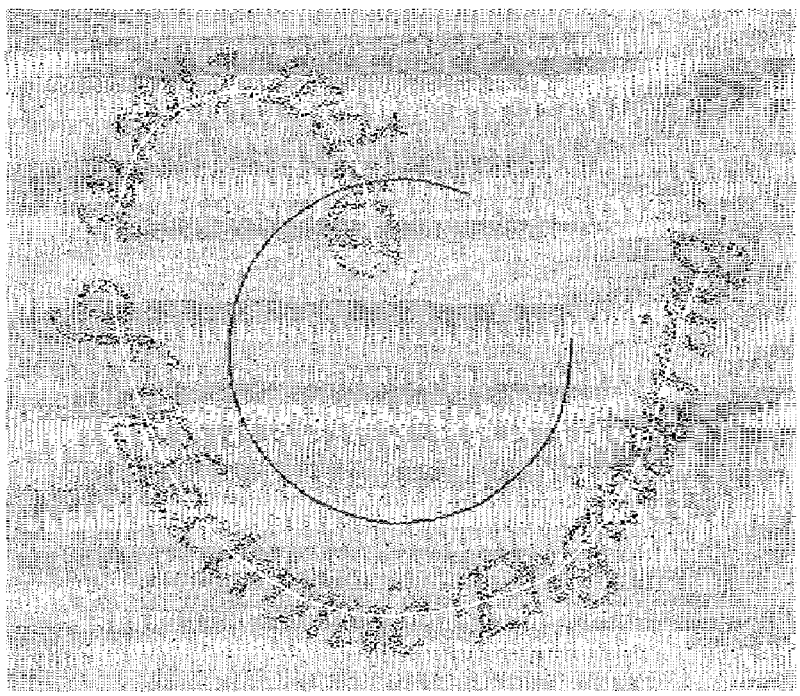

Two image down-sampling examples for speed improvement are shown in FIGS. 2 and 3 respectively. FIG. 15(a) shows a spiral text string with noisy background and the curve tracing result. The FCT algorithm started with an open circle (gray line) and converged to the spiral curve (white line) that is the skeleton of the text string. With only 10% of randomly selected foreground pixels kept the down-sampled image and the traced curve shown in FIG. 15(b) were obtained. It can be seen that the skeleton of the text string produced from the down-sampled image is as good as that from the original image. The computing time reduced from 80 seconds to 8 seconds by down sampling, a reduction of 90%, which is exactly the rate of reduction of the number of input samples.

Figure 16A:
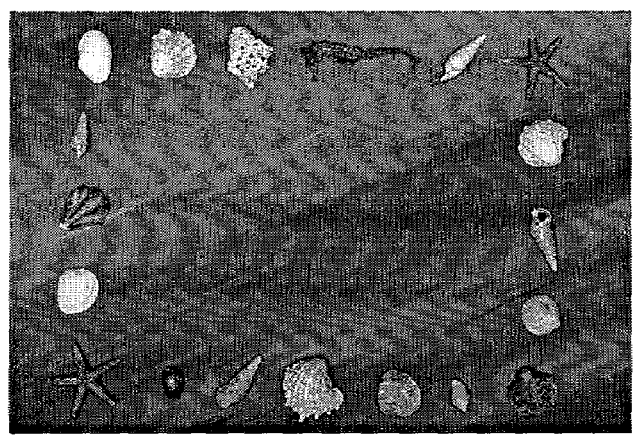
FIG. 16 illustrates and example of thinning the edge image according to a second embodiment of the invention.
Figure 16B:
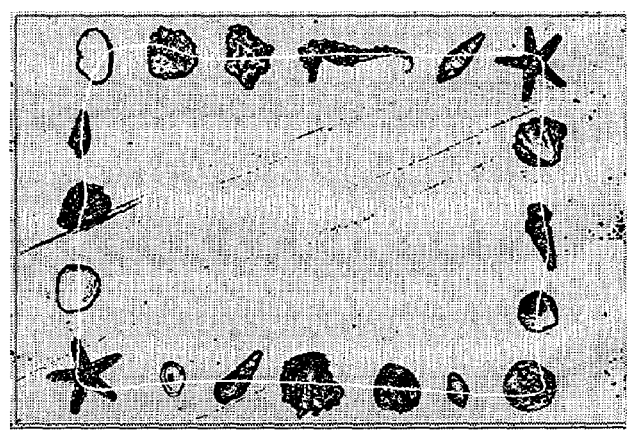
Figure 16C:
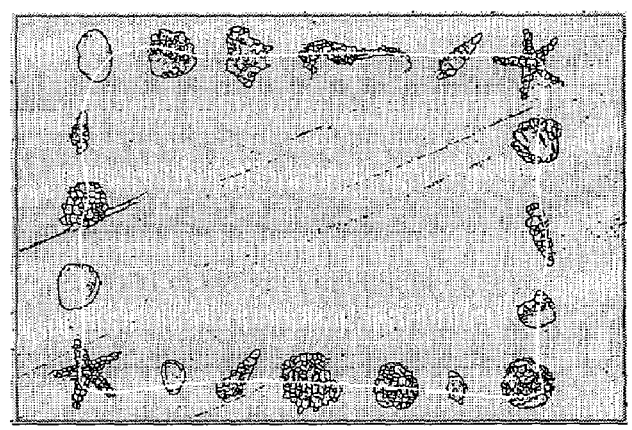

FIG. 16(a) shows a boundary made up of loosely related shells and FIG. 16(b) shows its thresholded edge image and the skeleton extracted by applying the FCT algorithm to all edge points. Although the method is used to detect the rectangular skeleton in this image, it should work well with more general shapes of this kind of skeletons although the problem seems difficult because of gaps between the objects and background noise. To improve the computing speed the number of input samples are reduced by thinning the edge image. FIG. 16(c) shows the thinned edges and the traced curve obtained using the FCT algorithm. By using the thinned edges, the number of input samples is reduced by 58% and the computing time including edge-thinning time is reduced by 49%. The computing time for edge thinning only has an overhead of about 1% of the total computing time.

The down sampling scheme works effectively for images with random noise since the noise pixels are down sampled as well. The edge thinning method works better if the image contains lines of different widths and the background noise appears as blobs or lines but not isolated points. In practical applications the two methods are combined to reduce the computing time even further.

Note that image down sampling is different from a reduction of its resolution. For example, neighboring thin lines become noisy but still exit after down sampling, but the lines may be blurred and merged to the same line after a reduction of the image resolution.

The solution of $\mu_{ik}$ in Equation (22) is a complicated nonlinear function of $v_k$, so the FCT algorithm can be trapped at a locally optimal point. The following discussion explains how two types of traps can be detected and removed based on the SCM sequence defined in Equation (35). Two types of traps are discussed.

Figure 17A:
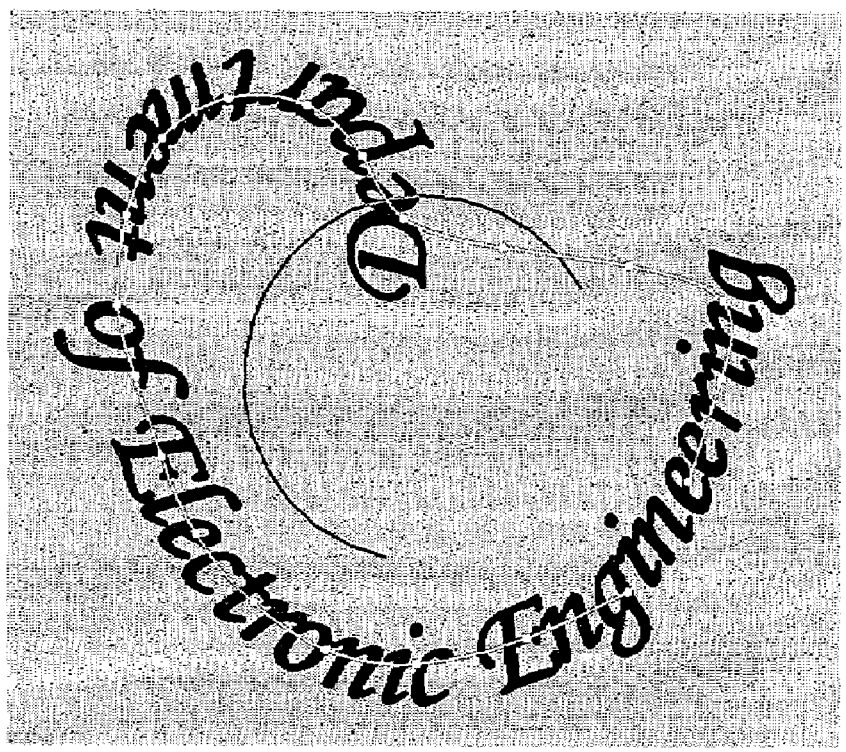
FIG. 17 illustrates and example of a type-1 trap.
Figure 17B:
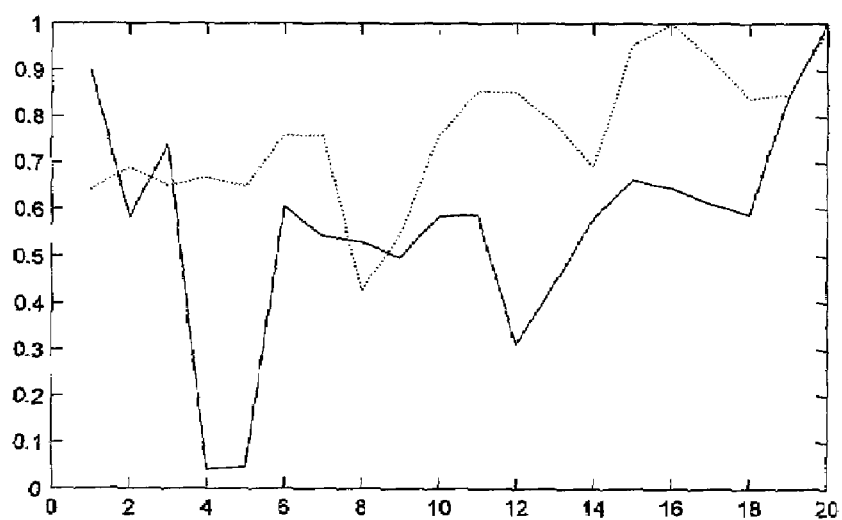
Figure 17C:
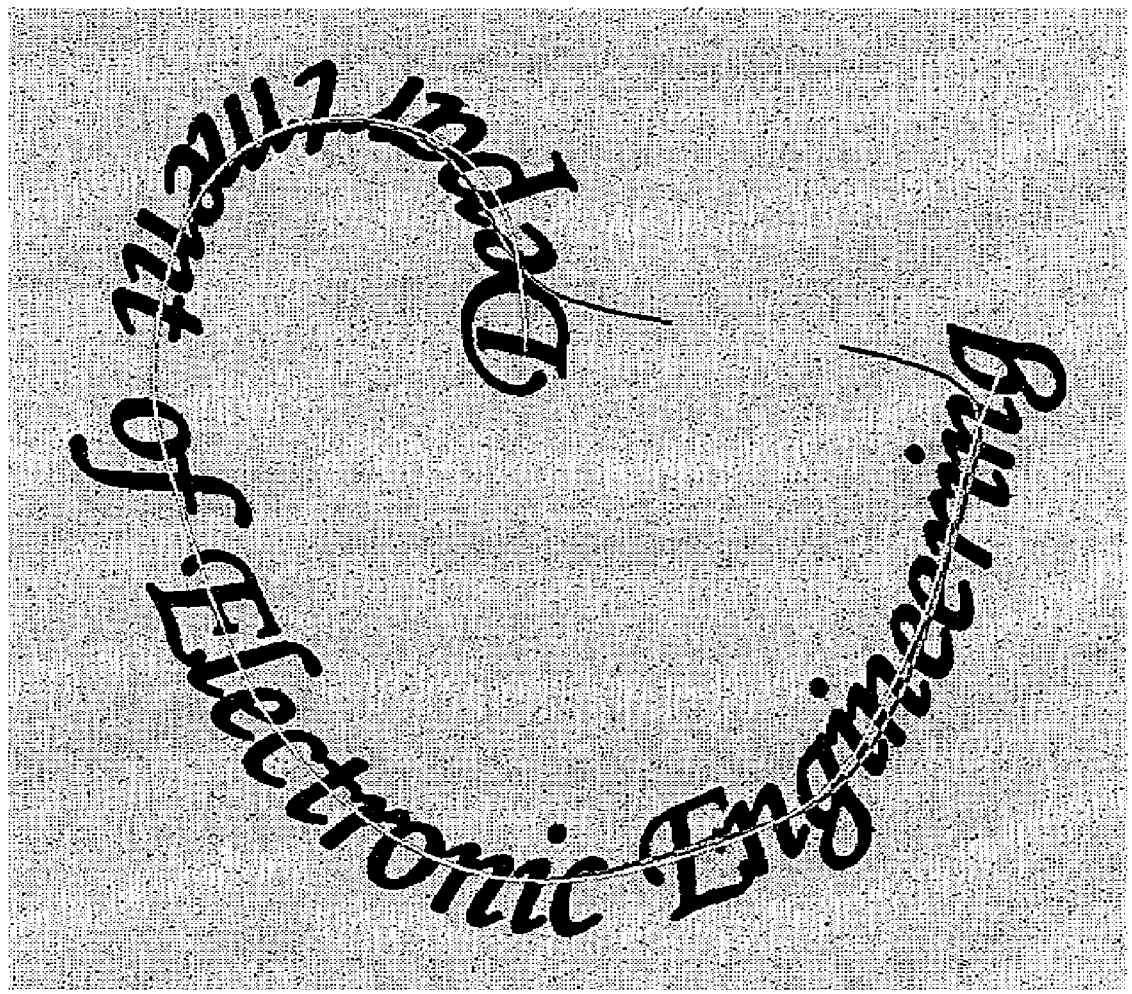

A "type-1" trap causes an open curve to be open at an incorrect location. An example is shown in FIG. 17(a) The trap can be detected based on the SCM sequence. The SCM curve shows a valley corresponding to small values of $s_4$ and $s_5$ (solid line in FIG. 17(b)). This means $v_4$ and $v_5$ are placed in areas where none or not many input samples exist. By setting the threshold equal to 0.2 the valley can be detected in the SCM sequence, putting the opening between $v_4$ and $v_5$, corresponding to the middle of the valley. The final SCM sequence is shown in FIG. 17(b) with the dotted line, which now contains no valley. The curve with the adjusted opening and the final traced curve are shown in FIG. 17(c) with gray and white lines respectively.

Figure 18A:
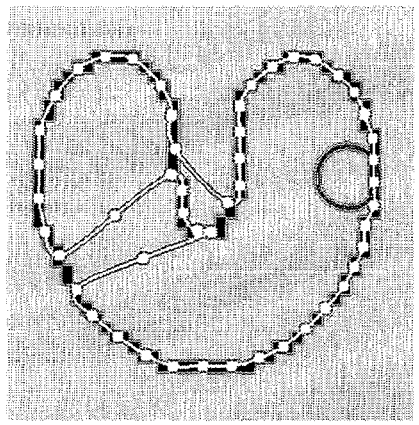
FIG. 18 illustrates and example of a type-2 trap.
Figure 18B:
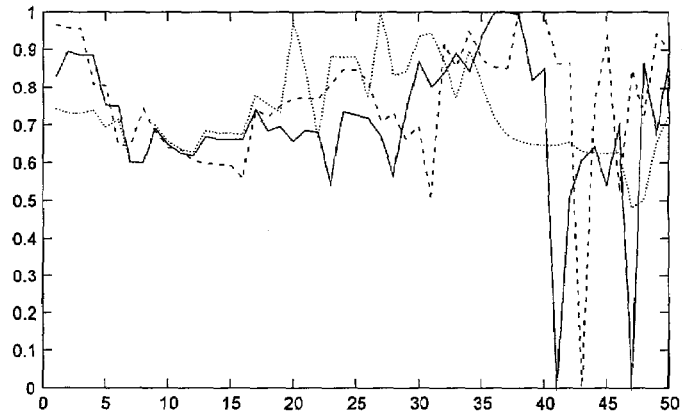
Figure 18C:
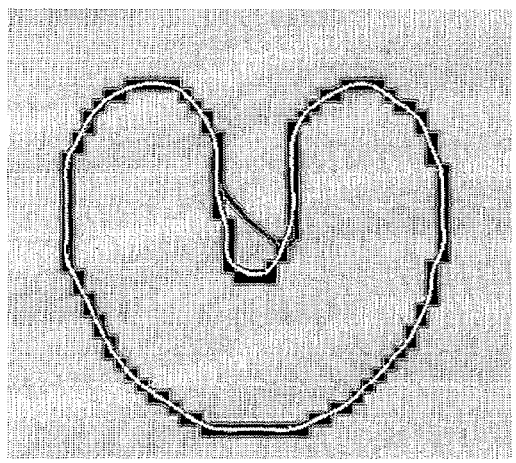
Figure 18D:
Figure 18E:
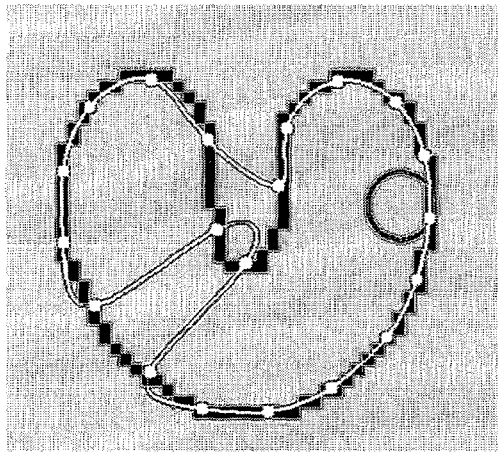
Figure 18F:
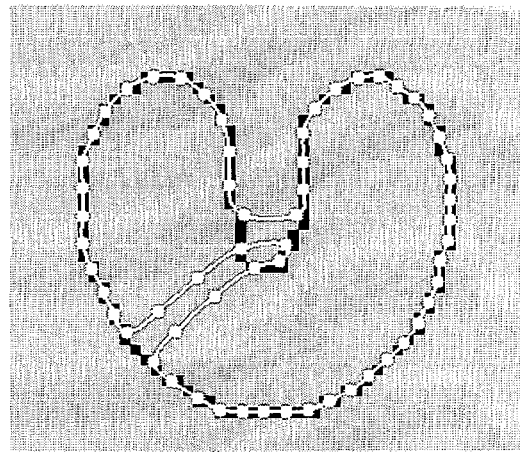

A "type-2" trap causes a small part of a curve to be trapped at another part of the curve. In the SCM sequence a type-2 trap corresponds to two close valleys. An example is shown in FIG. 6(a). The corresponding SCM sequences are shown in FIG. 18(b) with solid and dashed lines respectively. By setting a threshold at 0.2 the two valleys can be detected for the SCM sequence for the curve in FIG. 18(a). If two valleys are close enough, for example a threshold of 7 cluster centers, then the two valleys form a type-2 trap. In this example, there is only one trap along the curve and it does not seem necessary to test the closeness of the two valleys. However, if there are multiple valleys along the curve, then close valleys need to be paired to identify the traps. To remove the trap, the cluster centers in the valleys and between the valleys are moved to new locations by interpolation based on the two correct cluster centers closest to the two valleys. That is, from the SCM sequence in FIG. 18(b) it is detected that $v_{41}$ to $v_{47}$ are placed incorrectly and can be moved to, and evenly distributed on, the straight line connecting $v_{40}$ to $v_{48}$. The modified curve is shown as the gray line in FIG. 18(c). Now the FCT iterations can be restarted and the final curve traced is shown as the white line in FIG. 18(c).

Where in the foregoing description reference has been made to methods or elements have known equivalents then such are included as if individually set forth herein.

Embodiments of the invention have been described, however it is understood that variations, improvement or modifications can take place without departure from the spirit of the invention or scope of the appended claims.

What is claimed is:

1. A method in a computer of extracting a smooth curve from a plurality of image data points input into the computer, comprising:
    partitioning the data points into a plurality of first groups each defined by respective first center points,
    manipulating the first center points into a sequential order,
    re-partitioning the manipulated data points into a plurality of second groups each defined by respective second center points such that a curve passing through the second center points is smooth, and
    outputting the curve passing through the second center points so that it is visible through display.

2. The method of claim 1 wherein a c-means algorithm or c-shells clustering algorithm is used for partitioning the data points into the plurality of first groups each defined by respective center points.

3. The method of claim 1 wherein manipulating the first center points into a sequential order includes determining a relationship between each first group of data points and its neighbouring groups of data points, and ranking the groups in terms of the relationships.

4. The method of claim 3 wherein the relationship is a spatial distance between a group and a neighbouring group.

5. The method of claim 1 wherein manipulating the first center points into a sequential order includes removing any looping paths.

6. The method of claim 1 wherein manipulating the first center points into a sequential order includes determining if a smooth curve will be an open or a closed curve.

7. The method of claim 1 wherein re-partitioning the manipulated data points into a plurality of second groups each defined by respective second center points such that a curve passing through the second center points must be smooth includes combining a criterion function from a c-means algorithm or c-shells clustering algorithm and a constraining term.

8. The method of claim 7 wherein each data sample is associated with a group membership value continuous between 0 and 1.

9. The method of claim 1 wherein the data is pre-processed to reduce noise.

10. The method of claim 1 wherein the image data is separated at corner points and or intersections to reveal subsets of data representing only smooth curves.

11. A curve tracing system for extracting a smooth curve from a plurality of image data points, comprising:
    a computer having a processor,
    a computer input device for inputting a plurality of data points,
    a computer output device for outputting a curve extracted from the data points, and
    a storage device having computer-readable instructions thereon which when executed by the processor perform steps for extracting a smooth curve from a plurality of image data points input into the computer the steps comprising:
    partitioning the data points into first groups each defined by respective first center points,
    determining a spatial distance between one of the first groups and its neighbouring groups,
    arranging the first center points in terms of the spatial distance,
    re-partitioning the partitioned first groups of data points into second groups each defined by respective second center points such that a curve passing through the second center points must be smooth, including combining a criterion function from a c-means algorithm or c-shells clustering algorithm and a constraining term, and
    outputting the curve passing through the second center points to be visible on the computer output device.

12. A computer readable storage medium having computer readable instructions which when executed on a computer perform steps for extracting a smooth curve from a plurality of image data points input into the computer the steps comprising:
    partitioning a plurality of image data points into a plurality of first groups each defined by respective first center points,
    manipulating the first center points into a sequential order,
    re-partitioning the manipulated data points into a plurality of second groups each defined by respective second center points such that a curve passing through the second center points is smooth, and
    outputting the curve passing through the second center points so that it is visible through display.

13. The computer readable medium of claim 12 wherein a c-means algorithm or c-shells clustering algorithm is used for partitioning the data points into a plurality of groups each defined by a center point.

14. The computer readable medium of claim 12 wherein manipulating the center points into a sequential order includes determining a spatial distance between each first group of data points and its neighbouring groups of data points, and ranking the groups in terms of the spatial distance.

15. The computer readable medium of claim 12 wherein manipulating the first center points into a sequential order includes removing any looping paths.

16. The computer readable medium of claim 12 wherein manipulating the first center points into a sequential order includes determining if the smooth curve will be an open or a closed curve.

17. The computer readable medium of claim 12 wherein re-partitioning the manipulated data points into a plurality of second groups each defined by respective second center points such that a curve passing through the second center points must be smooth includes combining a criterion function from a c-means algorithm or c-shells clustering algorithm and a constraining term.

18. The computer readable medium of in claim 12 wherein the data is pre-processed to reduce noise.

19. The computer readable medium of claim 12 wherein the image data is separated at corner points and or intersections to reveal subsets of data representing only smooth curves.

20. A method in a computer of extracting a smooth curve from a plurality of image data points input into the computer, comprising:

partitioning the data points into a plurality of first groups each defined by respective first center points, manipulating the first center points into a sequential order, removing any looping paths from the ordered center points, re-partitioning the manipulated data points into a plurality of second groups each defined by respective second center points such that a curve passing through the second center points is smooth, and outputting the curve passing through the second center points so that it is visible through display.

* * * * *

UNITED STATES PATENT AND TRADEMARK OFFICE
CERTIFICATE OF CORRECTION

PATENT NO. : 7,263,538 B2  Page 1 of 1
APPLICATION NO. : 10/126000
DATED : August 28, 2007
INVENTOR(S) : Hong Yan It is certified that error appears in the above-identified patent and that said Letters Patent is hereby corrected as shown below:

Title Page: item (12)  United States Patent
            Hong

CHANGE TO:

(12)  United States Patent
       Yan

Item (75)  Inventor:  Yan Hong, Hong Kong (HK)

CHANGE TO:
 (75)  Inventor:  Hong Yan, Hong Kong (HK)

Signed and Sealed this

Twenty-sixth Day of February, 2008

JON W. DUDAS
*Director of the United States Patent and Trademark Office*